United States Patent Office 3,801,628
Patented Apr. 2, 1974

3,801,628
CYCLOHEXENYL ACETIC ACID COMPOUNDS
Michel Vincent, Bagneux, Georges Remond, Paris, and Jean-Claude Poignant, Wissous, France, assignors to Societe en nom Collectif Science Union et Cie, Societe Francaise de Recherche Medicale
No Drawing. Original application Nov. 3, 1969, Ser. No. 873,659, now Patent No. 3,697,588. Divided and this application May 8, 1972, Ser. No. 251,515
Int. Cl. A61k 27/00; C07c 103/30
U.S. Cl. 260—500.5 H    4 Claims

ABSTRACT OF THE DISCLOSURE

Cyclohexenyl acetic acid compounds of the formula

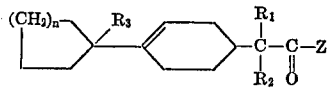

wherein:

$R_1$, $R_2$ and $R_3$ are hydrogen or lower alkyl;
$n$ is 1 to 4; and
X is hydroxyl, amino, alkylamino or hydroxylamino.

These compounds possess analgesic and antiinflammatory properties.

---

This application is a division of our co-pending application Ser. No. 873,659, filed Nov. 3, 1969, now U.S. Pat. 3,697,588.

The present invention provides new cyclohexenyl acetic acid compounds of the General Formula I:

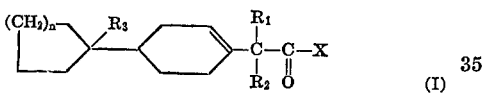

wherein:

$R_1$, $R_2$ and $R_3$ each represents a hydrogen atom or a lower alkyl radical containing 1 to 5 carbon atoms inclusive;
$n$ is an integer from 1 to 4 inclusive; and
X represents a hydroxyl, amino, lower alkylamino, wherein the alkyl moiety has from 1 to 5 carbon atoms inclusive, or hydroxylamino radical.

The new derivatives of the General Formula I were prepared by dehydrating a compound of the General Formula II:

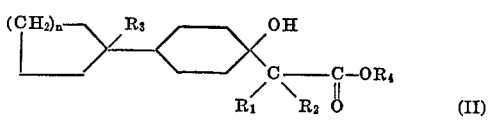

in which $R_1$, $R_2$ and $R_3$ have the meanings defined above and $R_4$ represents a lower alkyl radical containing 1 to 5 carbon atoms inclusive; and by reacting the so-obtained compound of the General Formula III:

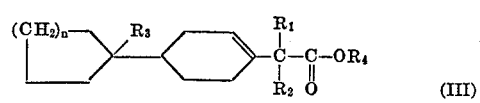

in which $R_1$, $R_2$, $R_3$ and $R_4$ have the meanings defined above, with a compound of the General Formula IV:

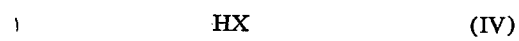

in which X has the meanings defined above.

The derivatives of the General Formula II are dehydrated by a method known per se, such for example, as the method described by G. A. R. Kon and K. S. Nargund, J. Chem. Soc. 2461 (1932).

The derivatives of the General Formula II themselves are prepared according to the Reformatsky reaction from 4-cycloalkyl cyclohexanone, prepared according to the method of A. R. Pinder, J. Chem. Soc. 1577 (1956), of the General Formula

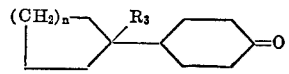

and from α-bromoester of the general formula

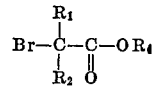

in which $R_1$, $R_2$, $R_3$ and $R_4$ have the meanings defined above.

The new derivatives of the General Formula I, in which X is a hydroxyl or hydroxylamino radical, can be transformed into addition salts with mineral or organic bases, such for example, as bases of alkaline or alkaline earth metals, primary, secondary and tertiary amines, such as mono-, di- and triethylamines, and heterocyclic bases such, for example, as morpholine, piperazine, piperidine, etc. The present invention also provides these salts.

All the derivatives of the present invention contain at least one asymmetric carbon atom and thus may be resolved in optical isomers by methods known per se. The optical isomers of the derivatives of the General Formula I are also included in the present invention.

The following examples illustrate the invention:

EXAMPLE 1

(4-cyclohexyl-1-cyclohexen-1-yl) acetic acid

A solution of 6.1 g. (0.024 mol.) of ethyl (4-cyclohexyl-1-cyclohexen-1-yl) acetate, B.P. 0.05 mm. Hg:124–125° C., prepared according to the methods of Reformatsky and G. A. R. Kon and K. S. Nargund, J. Chem. Soc. 2461 (1932), in 268 ml. of N-sodium hydroxide solution and 386 ml. of ethanol, is heated at reflux for 4 hours.

After concentration to dryness, the residue is dissolved into distilled water and the unsaponifiable products are extracted with ether. The aqueous layer is acidified until $pH_1$ with 5 N HCl, and the precipitated acid is taken out with ether. The ethered solution is washed with distilled water, dried on calcium sulphate, filtrated and concentrated to dryness. The crystalline residue is recrystallized from 250 ml. of pentane. 3.3 g. of (4-cyclohexyl-1-cyclohexen-1-yl) acetic acid, M.P. (capillary) 100–101° C., are obtained, yield: 61.2%.

EXAMPLES 2 TO 9

The following derivatives are prepared according to the method described in Example 1:

(2) α-(4-cyclohexyl-1-cyclohexen-1-yl) propionic acid: M.P. (capillary): 55–57° C., starting from ethyl α-(4-cyclohexyl-1-cyclohexen-1-yl) propionate, B.P. 0.01 mm. Hg: 114–118° C., yield: 72.3%, itself prepared from ethyl α-(1-hydroxy-4-cyclohexyl cyclohexyl) propionate, B.P. 0.03 mm. Hg: 124–126° C., yield: 75.8%, itself prepared from 4-cyclohexyl cyclohexanone and ethyl α-bromopropionate, yield: 66.8%.

(3) α-(4-cyclohexyl-1-cyclohexen-1-yl) butyric acid: M.P. (capillary): 83–85° C., starting from ethyl α-(4-cyclohexyl-1-cyclohexen-1-yl) butyrate, B.P. 0.03 mm. Hg: 120–124° C., yield: 55.9%, itself prepared from ethyl α-(1-hydroxy-4-cyclohexyl cyclohexyl) butyrate, B.P. 0.01 mm. Hg: 148–152° C., yield: 71.4%, itself prepared from 4-cyclohexyl cyclohexanone and ethyl α-bromobutyrate, yield: 59.4%.

(4) α-(cyclohexyl-1-cyclohexen-1-yl) isobutyric acid: M.P. (Kofler) 141–142° C., starting from ethyl α-(4-cyclohexyl-1-cyclohexen-1-yl) isobutyrate, B.P. 0.05 mm. Hg: 120–122° C., yield: 47%, itself prepared from ethyl α-(1-hydroxy-4-cyclohexyl-cyclohexyl) isobutyrate, B.P. 0.05 mm. Hg: 128–132° C., yield: 61.9%, itself prepared from 4-cyclohexyl cyclohexanone and ethyl α-bromo isobutyrate, yield: 62.2%. The sodium α-(4-cyclohexyl-1-cyclohexen-1-yl) isobutyrate, M.P. (Kofler): 141–142° C., was prepared from α-(4-cyclohexyl-1-cyclohexen-1-yl) isobutyric acid previously obtained, yield: 74%.

(5) α - [4 - (1-methyl-cyclohexyl)-1-cyclohexen-1-yl] propionic acid: M.P. (capillary): 70–74° C., starting from ethyl α - [4 - (1-methyl-cyclohexyl)-1-cyclohexen-1-yl] propionate, B.P. 0.07 mm. Hg: 129–130° C., yield: 35%, itself prepared from ethyl α-[1-hydroxy-4-(1-methyl-cyclohexyl) cyclohexyl] propionate, B.P. 0.02 mm. Hg: 134–136° C., yield: 60.7%, itself prepared from 4-(1-methyl-cyclohexyl) cyclohexanone and ethyl α-bromopropionate, yield: 66.5%.

(6) α - [4 - (1 - methyl-cyclopentyl)-1-cyclohexen-1-yl] propionic acid: M.P. (capillary): 68–70° C., starting from ethyl α-[4-(1-methyl-cyclopentyl)-1-cyclohexen-1-yl] propionate, B.P. 0.07 mm. Hg: 120–122° C., yield: 72.8%, itself prepared from ethyl α-[1-hydroxy-4-(1-methyl-cyclopentyl) cyclohexyl] propionate, B.P. 0.05 mm. Hg: 120–124° C., yield: 74%, itself prepared from 4 - (1 - methyl-cyclopentyl) cyclohexanone and ethyl α-bromopropionate, yield: 74.6%.

(7) α - [4 - (1 - butyl-cyclopentyl)-1-cyclohexen-1-yl] propionic acid: starting from ethyl α-[4-(1-butyl-cyclopentyl) - 1 - cyclohexen - 1 - yl]propionate, itself prepared from ethyl α-[1-hydroxy-4-(1-butyl-cyclopentyl) cyclohexyl]propionate, itself prepared from 4-(1-butyl-cyclopentyl) cyclohexanone and ethyl α-bromopropionate.

(8) α - [4 - (1 - ethyl-cycloheptyl)-1-cyclohexen-1-yl] propionic acid: starting from ethyl α-[4-(1-ethyl-cycloheptyl)-1-cyclohexen-1-yl] propionate, itself prepared from ethyl α-[1-hydroxy-4-(1-ethyl-cycloheptyl) cyclohexyl], itself prepared from 4-(1-ethyl-cycloheptyl) cyclohexanone and ethyl α-bromopropionate.

(9) α - (4 - cyclooctyl - 1 - cyclohexen-1-yl) butyric acid: starting from ethyl α-(4-cyclooctyl-1-cyclohexen-1-yl) butyrate, itself prepared from ethyl α-(1-hydroxy-4-cyclooctyl cyclohexyl) butyrate, itself prepared from 4-cyclooctyl cyclohexanone and ethyl α-bromobutyrate.

EXAMPLE 10

(4-cyclohexyl-1-cyclohexen-1-yl) acetohydroxamic acid

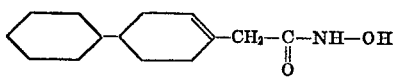

A hydroxylamine solution was prepared starting from 9.25 g. (0.13 mol) of hydroxylamine hydrochloride and 3.17 g. (0.13 atom-gramme) of sodium in 60 ml. of ethanol. The sodium chloride formed was filtrated and 22 g. (0.088 mol) of ethyl (4-cyclohexyl-1-cyclohexen-1-yl) acetate and a solution of sodium ethylate (prepared starting from 2 g. (0.088 atom-gramme) of sodium in 51 ml. of ethanol) were added to the filtrate while stirring and maintaining the temperature within the range of from 0 to +5° C. The mixture was then allowed to stand for 48 hours at room temperature, and concentrated to dryness.

The residue was dissolved in 1500 ml. of water and the solution acidified by hydrochloric acid until pH$_1$.

(4-cyclohexyl-1-cyclohexen-1-yl) acetohydroxamic acid was suctioned off, washed with distilled water, dried and crystallized in a water-ethanol solution. M.P. (capillary): 165–168° C., with decomposition, yield: 52.4%.

EXAMPLES 11 TO 12

The following derivatives were prepared according to the method described in Example 10.

(11) α - (4 - cyclohexyl - 1-cyclohexen-1-yl) propionohydroxamic acid: M.P. (Kofler Bank): 150–153° C., with decomposition (benzene), starting from ethyl α-(4-cyclohexyl - 1 - cyclohexen-1-yl) propionate, yield: 49.8 %.

(12) α - (4 - cyclohexyl - 1 - cycloexen-1-yl) butyrohydroxamic acid: M.P. (capillary): 122–125° C., with decomposition (pentane), starting from ethyl α-(4-cyclohexyl-1-cyclohexen-1-yl) butyrate, yield: 84%.

EXAMPLE 13

α-(4-cyclohexyl-1-cyclohexen-1-yl) propionamide

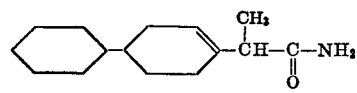

M.P. (Kofler): 140–141° C. (cyclohexane), starting from ethyl α-(4 - cyclohexyl - 1 - cyclohexen-1-yl) propionate and an ammoniacal solution, yield: 50%.

EXAMPLE 14

N-ethyl α-(4-cyclohexyl-1-cyclohexen-1-yl) pripionamide

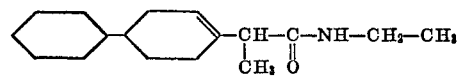

M.P. (capillary): 101–102° C. (pentane/cyclohexane), starting from ethyl α-(4-cyclohexyl-1-cyclohexen-1-yl) propionate and monoethylamine, yield: 31.6%.

The cyclohexenyl acetic acid derivatives and their physiologically tolerable salts of the present invention are valuable pharmaceutical products having especially analgesic and antiinflammatory properties.

The toxicity studied in mice showed that their LD$_{50}$ varies from 150 to 300 mg./kg. by the intraperitoneal route and from 750 to 2000 mg./kg. by the oral route.

The antiinflammatory activity was demonstrated according to the method of C. H. Winter et al. (Proc. Soc. Exp. Biol. Med. 3,544 (1962)). It was observed that the new compounds administered at doses of 40 to 80 mg./kg. P.O., decrease from 19 to 58% the plantar oedema of the rat's paw induced by carrageenine.

The analgesic activity was studied in rats by the method of L. O. Randall and J. J. Sellito (Arch. Internat. Pharmacodyn. 111,409 (1957)). It was noted that the new derivatives administered at doses of 40 to 80 mg./kg. P.O., increase the threshold of pain-perception from 16 to 137%.

The invention further includes pharmaceutical preparations containing a derivative of the General Formula I or a physiologically tolerable salt thereof in admixture or conjunction with a pharmaceutically suitable carrier such, for example, as distilled water, glucose, lactose, talc, starch, cocoa butter, etc. The pharmaceutical forms may be: tablets, dragées, capsules, suppositories or solutions for oral, rectal or parenteral administration at doses from 50 to 500 mg., 1 to 5 times per day.

We claim:
1. Cyclohexenyl acetic acid compounds of the formula:

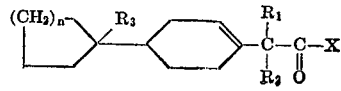

wherein:

$R_1$, $R_2$ and $R_3$ are selected from the group consisting of hydrogen and lower alkyl containing from 1 to 5 carbon atoms inclusive:

$n$ is an integer from 1 to 4 inclusive; and

X is hydroxylamino; and salt, thereof with pharmaceutically acceptable bases.

2. A compound of claim 1 which is α-(4-cyclohexyl-1-cyclohexen-1-yl) propionohydroxamic acid.

3. A compound of claim 1 which is (4-cyclohexyl-1-cyclohexen-1-yl) acetohydroxamic acid.

4. A compound of claim 1 which is α-(4-cyclohexyl-1-cyclohexen-1-yl) butyrohydroxamic acid.

References Cited
UNITED STATES PATENTS

| 3,479,396 | 11/1969 | Buu-Hoi et al. | 260—500.5 H |
| 3,481,940 | 12/1969 | Levy | 260—500.5 H |
| 3,697,588 | 10/1972 | Vincent et al. | 200—500.5 H |

FOREIGN PATENTS

| 1,584,641 | 10/1968 | France | 260—500.5 H |

JOSEPH E. EVANS, Primary Examiner

U.S. Cl. X.R.

260—247.2 R, 268 R, 293.88, 501.1; 424—248, 250, 267